US011920375B2

(12) United States Patent
Mohammed et al.

(10) Patent No.: US 11,920,375 B2
(45) Date of Patent: Mar. 5, 2024

(54) MODULAR BIDIRECTIONAL SPRING CAGE

(71) Applicant: Schlage Lock Company LLC, Carmel, IN (US)

(72) Inventors: Saagar Mohammed, Alappuzha (IN); Aaron P. McKibben, Fishers, IN (US); Nagesh Varadaraju, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 135 days.

(21) Appl. No.: 17/225,542

(22) Filed: Apr. 8, 2021

(65) Prior Publication Data

US 2022/0325556 A1 Oct. 13, 2022

(51) Int. Cl.
*E05B 3/06* (2006.01)
*E05B 1/00* (2006.01)
(Continued)

(52) U.S. Cl.
CPC ............ *E05B 3/065* (2013.01); *E05B 1/0053* (2013.01); *E05B 15/0033* (2013.01); (Continued)

(58) Field of Classification Search
CPC ... E05B 3/00; E05B 3/003; E05B 3/02; E05B 3/04; E05B 3/065; E05B 15/0033; (Continued)

(56) References Cited

U.S. PATENT DOCUMENTS 831,386 A * 9/1906 Simmons .............. E05B 55/005 70/DIG. 42
4,920,773 A 5/1990 Surko
(Continued)

FOREIGN PATENT DOCUMENTS

DE 102018122886 A1 * 3/2020 ............... E05B 3/06
EP 1467047 A2 * 10/2004 ............ E05B 3/065
(Continued)

OTHER PUBLICATIONS

Screen captures from YouTube video clip entitled "How to Remove a Driver Seat—2016 Subaru Forester," 2 pages, uploaded on Nov. 10, 17, 2019 by user "DIY Car Hunters". Retrieved from Internet: <https://www.youtube.com/watch?v=DsuN8kyOq64>. (Year: 2019).*
(Continued)

*Primary Examiner* — Christine M Mills
*Assistant Examiner* — Peter H Watson
(74) *Attorney, Agent, or Firm* — Taft Stettinius & Hollister LLP

(57) ABSTRACT

An exemplary apparatus includes a modular, self-contained spring cage and a spindle. The spring cage includes a housing and a clock spring mounted in the housing, and the clock spring includes a first leg and a second leg. The spindle extends through the spring cage, and is rotatable from a home position about a longitudinal axis in each of a first rotational direction and a second rotational direction. Rotation of the spindle from the home position in the first rotational direction causes pivoting of the first leg while the second leg remains stationary, thereby causing the clock spring to urge the spindle to return to the home position. Rotation of the spindle from the home position in the second rotational direction causes pivoting of the second leg while the first leg remains stationary, thereby causing the clock spring to urge the spindle to return to the home position.

21 Claims, 10 Drawing Sheets

(51) Int. Cl.
*E05B 15/00* (2006.01)
*E05B 15/04* (2006.01)

(52) U.S. Cl.
CPC ............ *E05B 15/004* (2013.01); *E05B 15/04* (2013.01); *E05B 2015/042* (2013.01); *E05Y 2201/404* (2013.01); *E05Y 2201/47* (2013.01)

(58) Field of Classification Search
CPC .................... E05B 15/004; E05B 15/04; E05B 2015/0403; E05B 2015/042; E05B 1/00; E05B 1/0007; Y10S 292/53; Y10S 292/54; Y10S 292/61
USPC .......................... 292/347, 348, 357, 358, 350
See application file for complete search history.

(56) References Cited

U.S. PATENT DOCUMENTS

| | | | | | |
|---|---|---|---|---|---|
| 5,029,914 | A * | 7/1991 | Hankel | E05B 3/06 292/336.5 |
| 7,497,486 | B1 | 3/2009 | Davis et al. | |
| 7,828,349 | B2 * | 11/2010 | Chen | E05B 3/065 292/347 |
| 10,752,133 | B2 * | 8/2020 | Nacy | B60N 2/20 |
| 2004/0160068 | A1 | 8/2004 | Dalsing | |
| 2005/0223763 | A1 * | 10/2005 | Huang | E05B 3/065 70/224 |
| 2007/0176435 | A1 * | 8/2007 | Zimmer | E05B 3/065 292/336.3 |
| 2015/0015003 | A1 * | 1/2015 | Tsai | E05B 3/065 292/336.3 |
| 2021/0032912 | A1 * | 2/2021 | Inan | E05B 81/34 |

FOREIGN PATENT DOCUMENTS

| | | | | |
|---|---|---|---|---|
| EP | 1526238 A2 * | 4/2005 | E05B 81/25 |
| GB | 937112 A * | 4/1961 | E05B 3/065 |
| WO | WO-2007089135 A1 * | 8/2007 | E05B 13/005 |

OTHER PUBLICATIONS

Machine translation of DE-102018122886-A1 (Year: 2020).*
International Search Report; International Searching Authority; International Patent Application No. PCT/US2022/024055; dated Oct. 25, 2022; 4 pages.
Written Opinion of the International Searching Authority; International Searching Authority; International Patent Application No. PCT/US2022/024055; dated Oct. 25, 2022; 8 pages.

* cited by examiner

MODULAR BIDIRECTIONAL SPRING CAGE

TECHNICAL FIELD

The present disclosure generally relates to spring cages, and more particularly but not exclusively relates to spring cages for locksets.

BACKGROUND

Handlesets for locks are often provided with spring cages that bias the handle toward a home position. Some existing spring cages suffer from a variety of drawbacks and limitations, such as those related to ease of installation and the inability to be used in multiple orientations. For these reasons among others, there remains a need for further improvements in this technological field.

SUMMARY

An exemplary apparatus includes a modular, self-contained spring cage and a spindle.

The spring cage includes a housing and a clock spring mounted in the housing, and the clock spring includes a first leg and a second leg. The spindle extends through the spring cage, and is rotatable from a home position about a longitudinal axis in each of a first rotational direction and a second rotational direction opposite the first rotational direction. Rotation of the spindle from the home position in the first rotational direction causes pivoting of the first leg while the second leg remains stationary, thereby deforming the clock spring such that the clock spring exerts a first biasing force urging the spindle to return to the home position. Rotation of the spindle from the home position in the second rotational direction causes pivoting of the second leg while the first leg remains stationary, thereby deforming the clock spring such that the clock spring exerts a second biasing force urging the spindle to return to the home position. Further embodiments, forms, features, and aspects of the present application shall become apparent from the description and figures provided herewith.

DETAILED DESCRIPTION OF ILLUSTRATIVE EMBODIMENTS

Figure 1:
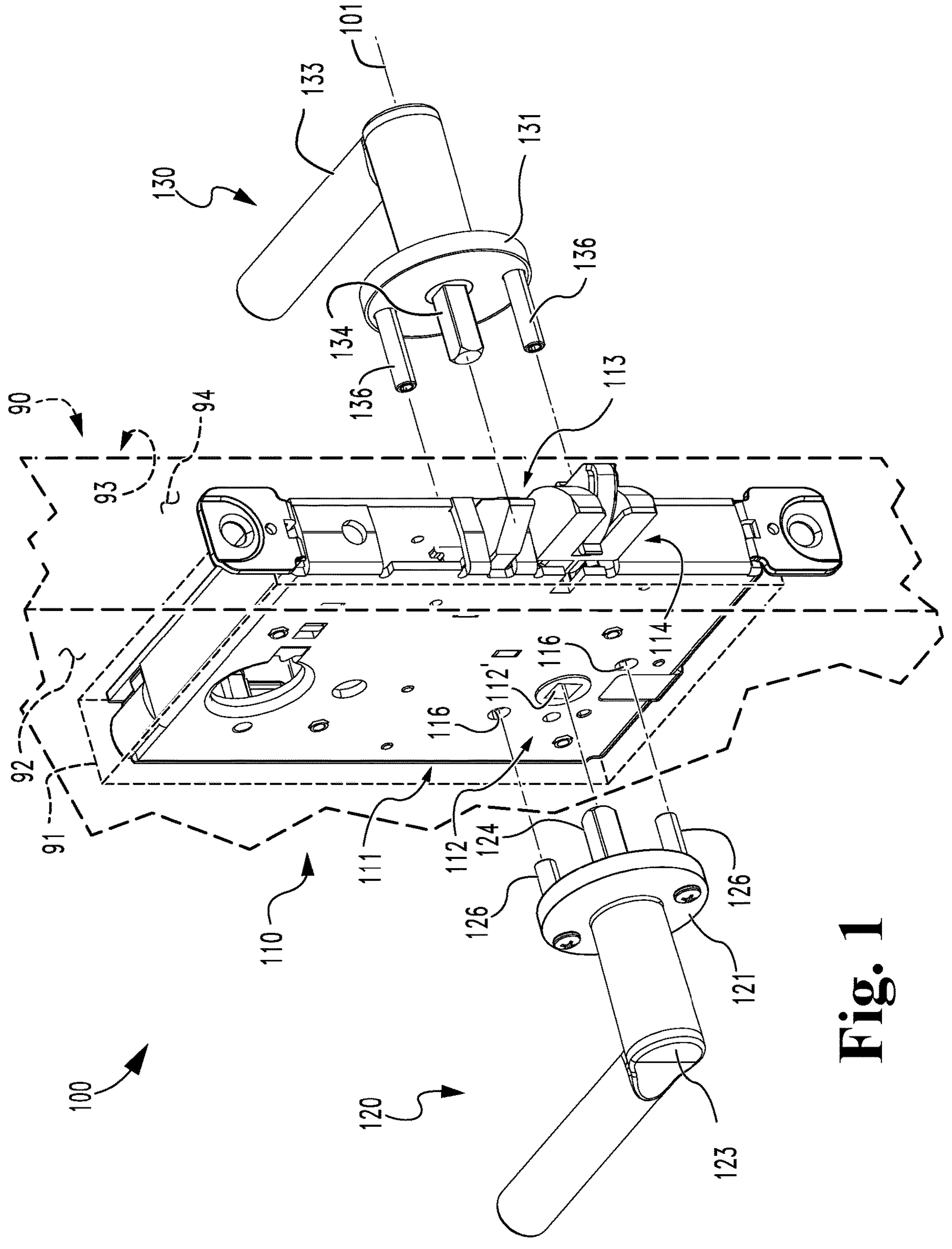
FIG. 1 is a partially exploded view of a lockset according to some embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a “preferred” component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of “at least one of A, B, and C” can mean (A); (B); (C); (A and B); (B and C); (A and C); or (A, B, and C). Similarly, items listed in the form of “at least one of A, B, or C” can mean (A); (B); (C); (A and B); (B and C); (A and C); or (A, B, and C). Items listed in the form of “A, B, and/or C” can also mean (A); (B); (C); (A and B); (B and C); (A and C); or (A, B, and C). Further, with respect to the claims, the use of words and phrases such as “a,” “an,” “at least one,” and/or “at least one portion” should not be interpreted so as to be limiting to only one such element unless specifically stated to the contrary, and the use of phrases such as “at least a portion” and/or “a portion” should be interpreted as encompassing both embodiments including only a portion of such element and embodiments including the entirety of such element unless specifically stated to the contrary.

In the drawings, some structural or method features may be shown in some specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a lockset 100 according to some embodiments installed to a door 90. The door 90 has a door preparation in the form of a mortise cutout 91 formed therein, and includes an outer or non-egress side 92, an inner or egress side 93, and a latch edge 94. The lockset 100 generally includes a chassis 110 mounted in the cutout 91, an outside handleset 120 mounted to the outer or non-egress side 92, and an inside handleset 130 mounted to the inner or egress side 93.

The chassis 110 generally includes a housing 111, a first or outside hub 112 rotatably mounted to the housing 111 on a first side of the chassis 110, a second or inside hub 113 rotatably mounted to the housing 111 on an opposite second side of the chassis 110, and a latchbolt 114 mounted for movement relative to the housing 111 between an extended position and a retracted position. Each hub 112, 113 is mounted for rotation about a longitudinal rotational axis 101 that extends into each of the handlesets 120, 130. Each hub 112, 113 is operably connected with the latchbolt 114 such that rotation of either hub 112, 113 from a hub home position to a hub rotated position causes a corresponding retraction of the latchbolt 114. In the illustrated form, the chassis 110 is provided as a mortise-format chassis that mounts in the mortise cutout 91 of the door 90. As described herein, it is also contemplated that the chassis 110 may take another format, such as the cylindrical format, the tubular format, a hybrid format, or another format. Those skilled in the art will be familiar with these formats and readily recognize the manner in which each format translates rotation of a rotatable member (e.g., a hub or a retractor) to retraction of a latchbolt. As such, the details regarding retraction of a latchbolt in response to rotation of a rotatable member need not be provided herein.

The outside handleset 120 is configured for mounting to the outer or non-egress side 92 of the door 90, and generally includes an outside spring cage 121, an outside handle 123 rotatably mounted to the outside spring cage 121, and an outside spindle 124 rotationally coupled with the outside handle 123. When the outside handleset 120 is mounted to the chassis 110, the spindle 124 is engaged with the outside hub 112 such that the outside hub 112 is rotationally coupled with the outside handle 123. More particularly, the distal end portion of the spindle 124 is received in and engaged with an opening 112' formed in the hub 112 such that the spindle 124 is rotationally coupled with the hub 112. Thus, when the lockset 100 is unlocked, the outside hub 112 causes retraction of the latchbolt 114 in response to rotation of the outside handle 123. As described herein, the outside spring cage 121 is operable to provide bidirectional biasing forces urging the outside handle 123 toward its home position.

Figure 2:
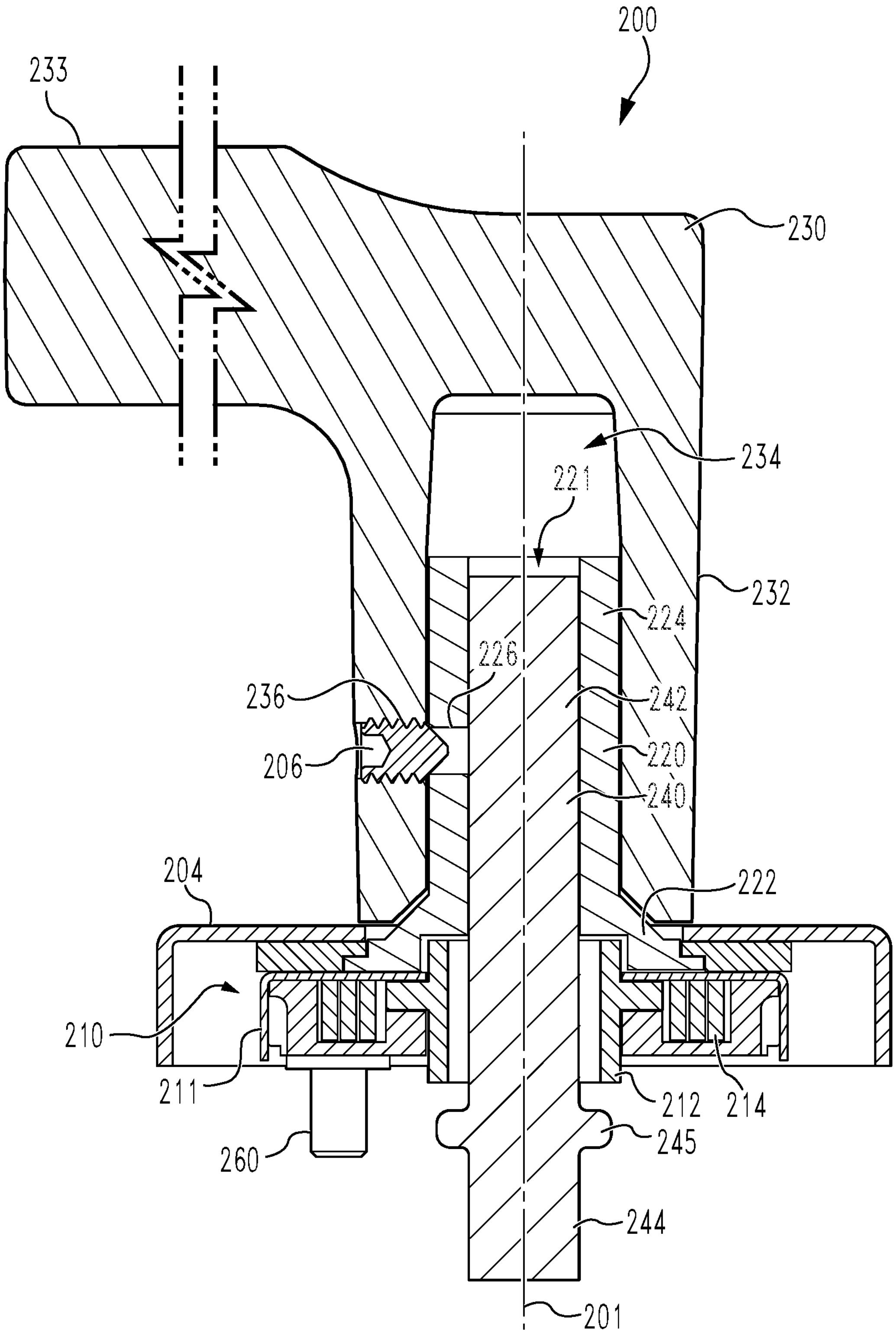
FIG. 2 is a cross-sectional illustration of a handleset according to some embodiments.

In some forms, the outside handleset 120 may be provided along the lines of the handleset 200 illustrated in FIG. 2. In some forms, the outside spring cage 121 may be provided along the lines of the spring cage 300 illustrated in FIGS. 3-5. In some forms, the outside spring cage 121 may be provided along the lines of the spring cage 400 illustrated in FIGS. 6-9. In some forms, the outside spring cage 121 may be provided along the lines of the spring cage 500 illustrated in FIGS. 10-13.

The inside handleset 130 is configured for mounting to the inner or egress side of the door 90, and is substantially similar to the outside handleset 120. The inside handleset 130 generally includes an inside spring cage 131, an inside handle 133 rotatably mounted to the inside spring cage 131, and an inside spindle 134 rotationally coupled with the inside handle 133. When the inside handleset 130 is mounted to the chassis 110, the spindle 134 is engaged with the inside hub 113 such that the inside hub 113 is rotationally coupled with the inside handle 133. Thus, the inside hub 113 causes retraction of the latchbolt 114 in response to rotation of the inside handle 133. As described herein, the inside spring cage 131 is operable to provide bidirectional biasing forces urging the inside handle 133 toward its home position.

In some forms, the inside handleset 130 may be provided along the lines of the handleset 200 illustrated in FIG. 2. In some forms, the inside spring cage 131 may be provided along the lines of the spring cage 300 illustrated in FIGS. 3-5. In some forms, the inside spring cage 131 may be provided along the lines of the spring cage 400 illustrated in FIGS. 6-9. In some forms, the inside spring cage 131 may be provided along the lines of the spring cage 500 illustrated in FIGS. 10-13.

The handlesets 120, 130 may include features that facilitate the removable mounting of the handlesets 120, 130 to the chassis 110. In the illustrated form, the outside handleset 120 includes a pair of lugs 126 configured to extend into a pair of openings 116 formed in the chassis 110, and the inside handleset 130 includes a pair of bolts 136 that extend into the chassis 110 and engage the lugs 126 such that the chassis 110 is securely captured between the handlesets 120, 130. It should be appreciated that other configurations are contemplated. For example, the inside handleset 130 may include one or more lugs and the outside handleset 120 may include one or more bolts that extend into the chassis 110 and engage the lugs of the inside handleset 130.

With additional reference to FIG. 2, illustrated therein is a handleset 200 according to some embodiments. The handleset 200 may, for example, be utilized in the lockset 100 as the outside handleset 120 and/or the inside handleset 130. The handleset 200 generally includes a spring cage 210, a spindle sleeve 220 rotatably supported by the spring cage 210 for rotation about a longitudinal rotational axis 201, a handle 230 mounted to the spindle sleeve 220, and a spindle 240 rotationally coupled with the handle 230 via the spindle sleeve 220, and may further include one or more lugs 260 along the lines of the above-described lugs 126. In some embodiments, the handleset 200 may include a rose 204 that covers the spring cage 210. In some embodiments, the handleset 200 may include a fastener 206, such as a set screw, which may be utilized to removably secure the handle 230 to the spindle sleeve 220.

The spring cage 210 generally includes a housing 211, at least one spring cage hub 212 rotatably mounted in the housing 211, and a biasing member 214 urging the at least one hub 212 toward a home position. As described herein, the at least one hub 212 is engaged with the spindle 240 such that the biasing member 214 urges the spindle 240 toward a home position, thereby biasing the handle 230 toward a corresponding and respective home position. In some forms, the spring cage 210 may be provided along the lines of the spring cage 300 illustrated in FIGS. 3-5. In some forms, the spring cage 210 may be provided along the lines of the spring cage 400 illustrated in FIGS. 6-9. In some forms, the spring cage 210 may be provided along the lines of the spring cage 500 illustrated in FIGS. 10-13. In some embodiments, the spring cage 210 may further include a viscous damping grease that slows the rotation of the hub 212 relative to the housing 211.

The spindle sleeve 220 is mounted between the handle 230 and the spindle 240 such that the handle 230 is engaged with the spindle 240 via the spindle sleeve 220. The spindle sleeve 220 defines an internal chamber 221, and generally includes a base portion 222 and a longitudinally-extending body 224 extending proximally from the base portion 222. The chamber 221 is sized and shaped to slidably receive a portion of the spindle 240 for rotational coupling with the spindle 240. While other geometries are contemplated, the illustrated chamber 221 has a generally square-shaped cross-section. The base portion 222 is positioned at a distal end of the spindle sleeve 220, and is rotatably supported by the spring cage 210. As a result, the spindle sleeve 220 is biased to a home position by the biasing member 214, which biases the spindle 240 toward its home position as noted above. The body 224 may include an aperture 226 for receiving a portion of the fastener 206. While the illustrated fastener-receiving aperture 226 extends radially through the wall of the body 224, it is also contemplated that the aperture 226 may not necessarily extend through the entire thickness of the wall that defines the body 224.

The handle 230 is removably mounted to the spindle sleeve 220, and generally includes a shank 232 extending along the longitudinal axis 201 and a grip portion 233 extending from the shank 232 in at least one direction transverse to the longitudinal axis 201. In the illustrated form, the handle 230 is provided as a lever handle in which the grip portion 233 extends from the shank 232 primarily in one direction transverse to the longitudinal axis 201. It is also contemplated that the handle 230 may take another form in which the grip portion 233 extends from the shank 232 in multiple directions transverse to the longitudinal axis 201. For example, the handle 230 may be provided in the form of a knob-type handle in which the grip portion 233 is provided as a knob.

The handle 230 further includes a chamber 234 extending from a distal end of the shank 232. The chamber 234 receives the body 224 of the spindle sleeve 220 such that an aperture 236 of the handle 230 is aligned with the aperture 226 of the spindle sleeve 220. The fastener 206 extends from the shank aperture 236 into the second spindle sleeve aperture 226, thereby rotationally coupling the handle 230 with the spindle sleeve 220, which is in turn engaged with the spindle 240. As a result, the handle 230 is biased toward a handle home position by the spring cage 210.

The spindle 240 is slidably received in the spindle sleeve 220, and generally includes a proximal end portion 242 and an opposite distal end portion 244, and a flange 245 is formed adjacent the distal end portion 244. The proximal end portion 242 extends through the hub 212 of the spring cage 210 and into the chamber 221 of the spindle sleeve 220. The proximal end portion 242 is sized and shaped for rotational coupling with the spindle sleeve 220. For example, the illustrated proximal end portion 242 has a generally square-shaped cross-section corresponding to the generally square-shaped cross-section of the spindle sleeve chamber 221. It is also contemplated that one or both of the chamber 221 and/or the proximal end portion 242 may have a different geometry. The distal end portion 244 is sized and shaped to engage the hub 112 for rotational coupling with the hub 112. In the illustrated form, the opening 112' in the outside hub 112 has a generally square-shaped cross-section, and the distal end portion 244 has a corresponding generally square-shaped cross-section. It is also contemplated that one or both of the hub opening 112' and/or the distal end portion 244 may have a different geometry. When the distal end portion 244 is seated in the hub opening 112', the flange 245 may abut the face of the hub 112.

In embodiments that include the lugs 260, the lugs 260 extend generally parallel to the longitudinal axis 201, and are configured to extend into the openings 116 of the chassis 110. Each lug 260 is configured to receive a corresponding and respective bolt of an inside handle assembly, such as the bolts 136 of the inside handleset 130. The lugs 260 may be mounted to the housing 211 of the spring cage 210 at locations selected such that the lugs 260 do not interfere with the rotation of the hub 212 through its normal rotational range.

Figure 3:
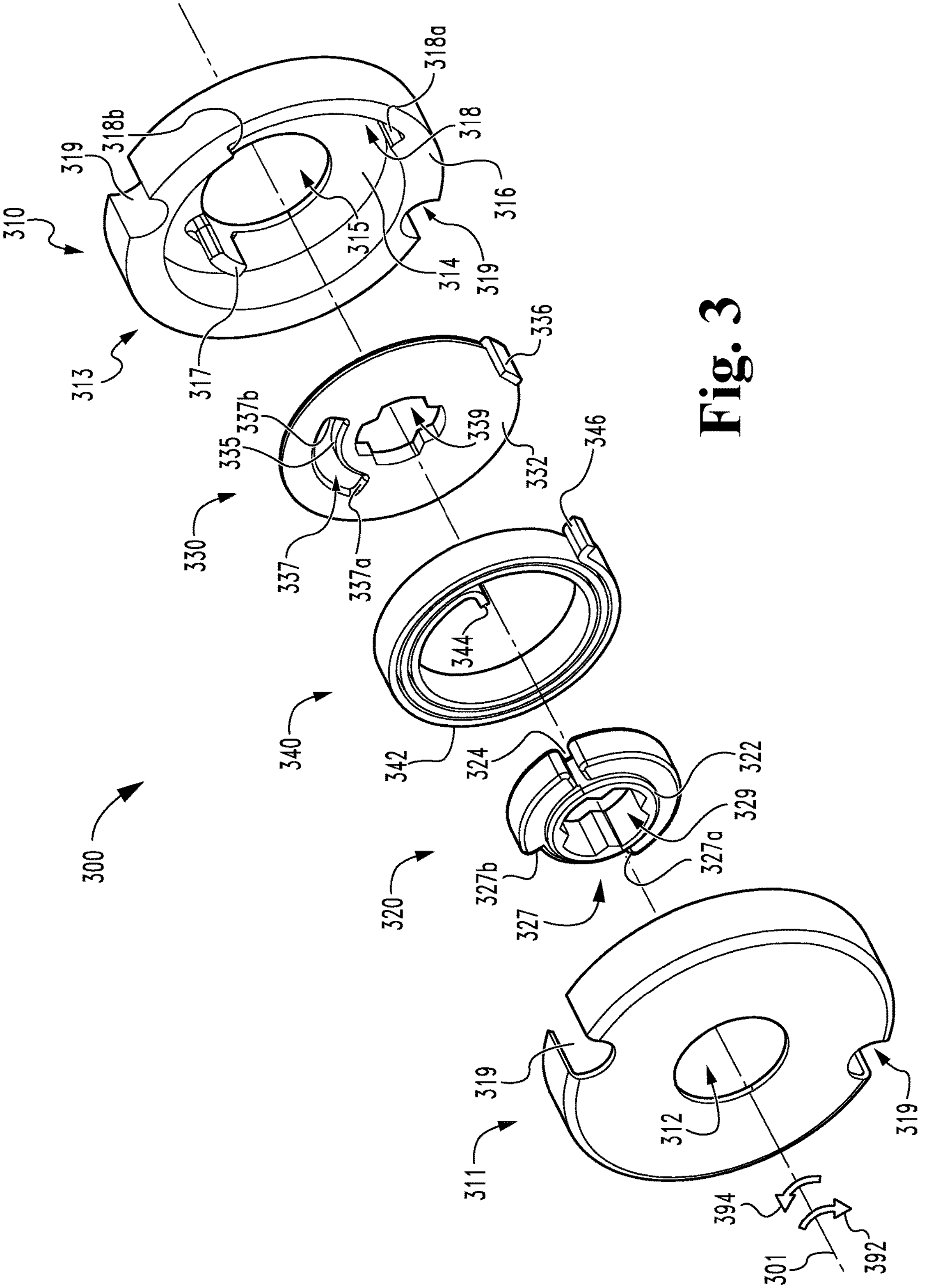
FIG. 3 is an exploded assembly view of a spring cage according to some embodiments.
Figure 5:
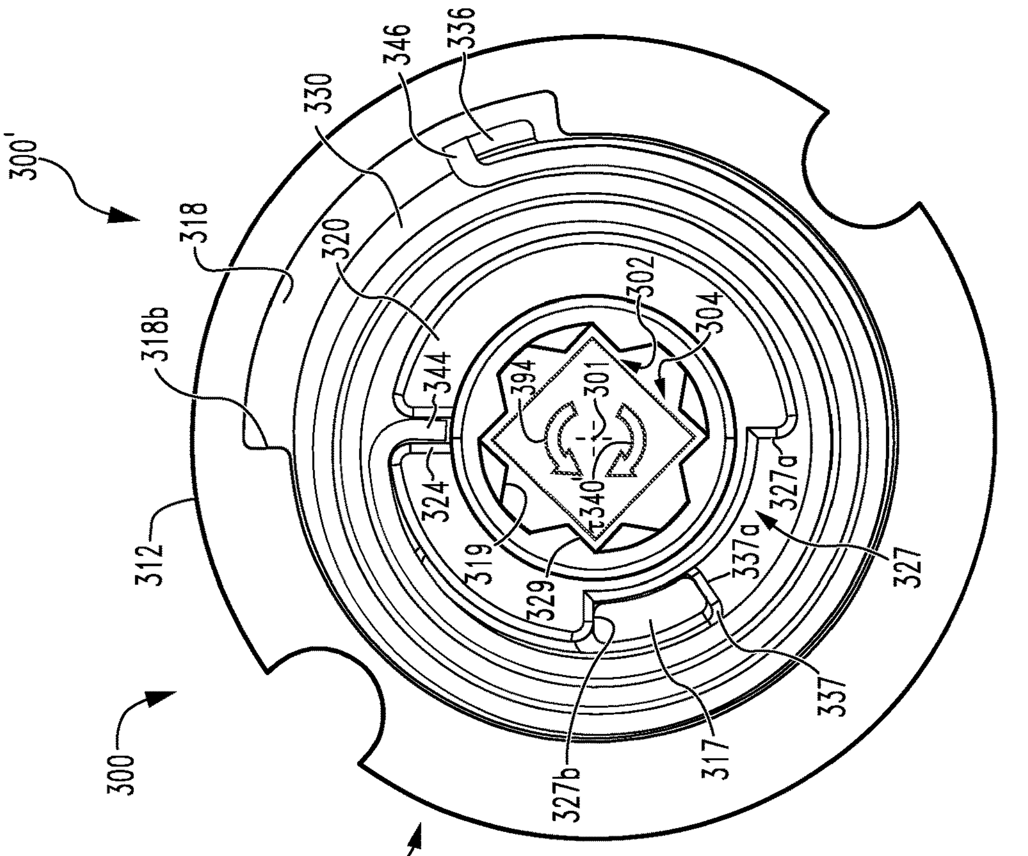
FIG. 5 is a cross-sectional view of the apparatus illustrated in FIG. 4 indicating rotation of the spindle in a second rotational direction opposite the first rotational direction.
Figure 4:
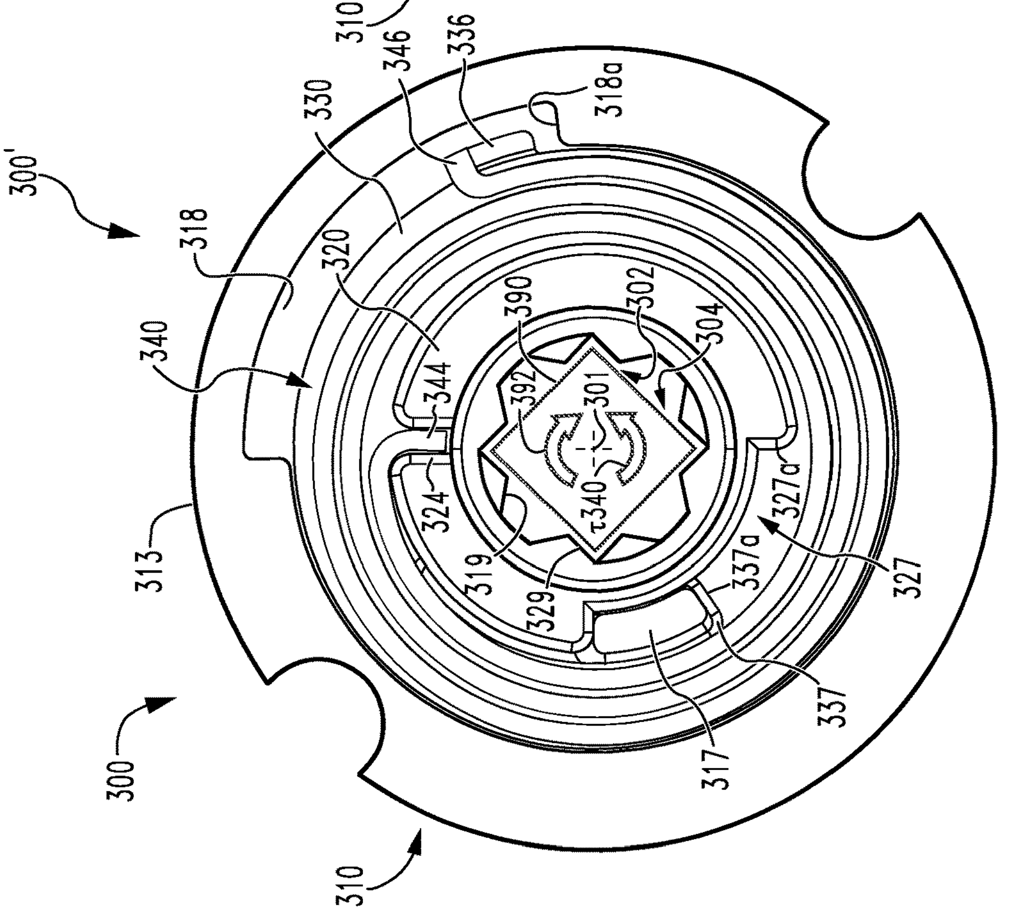
FIG. 4 is a cross-sectional view of an apparatus including the spring cage illustrated in FIG. 3 indicating rotation of a spindle in a first rotational direction.
Figure 6:
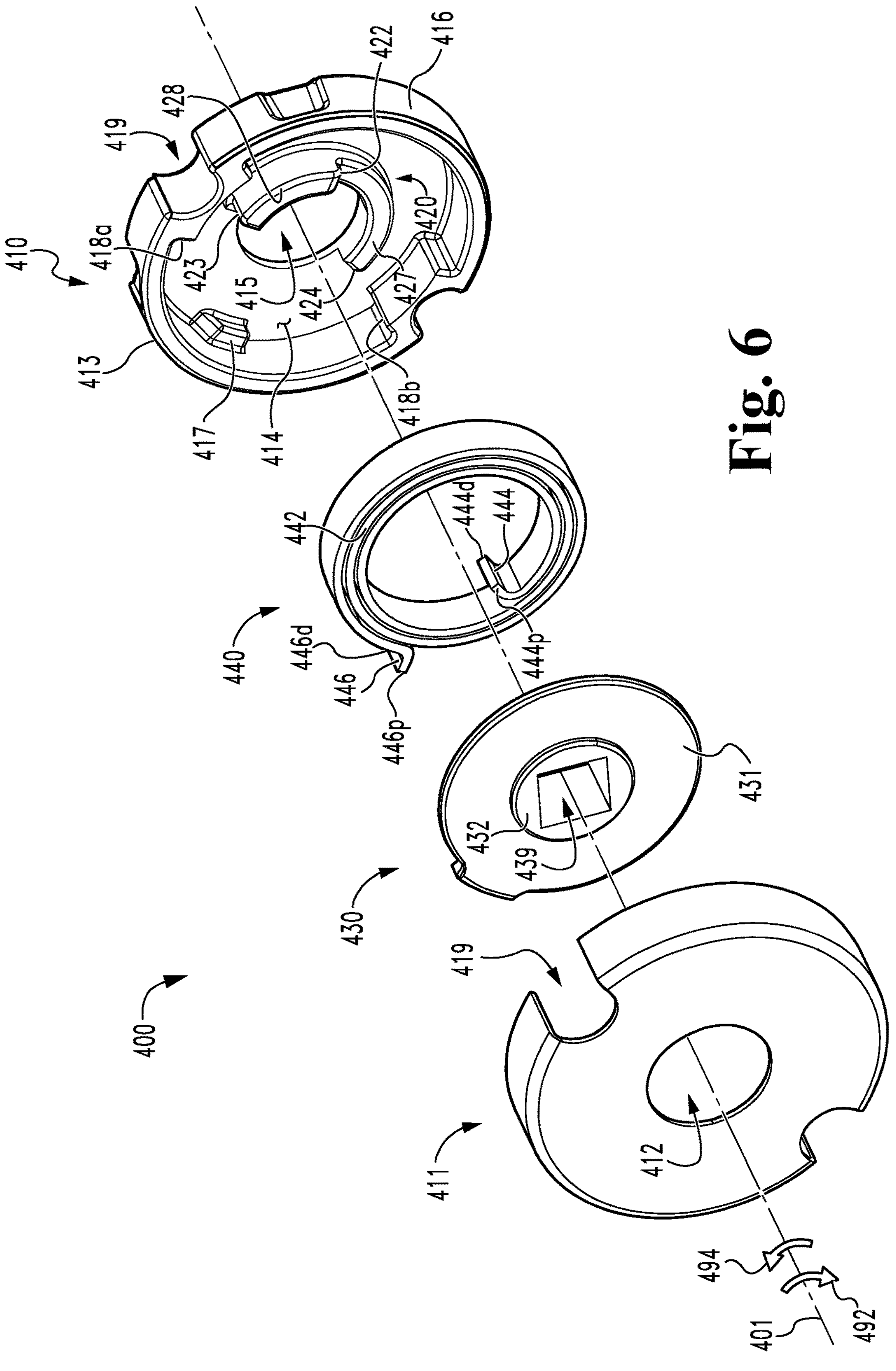
FIG. 6 is a first exploded assembly view of a spring cage according to some embodiments.
Figure 7:
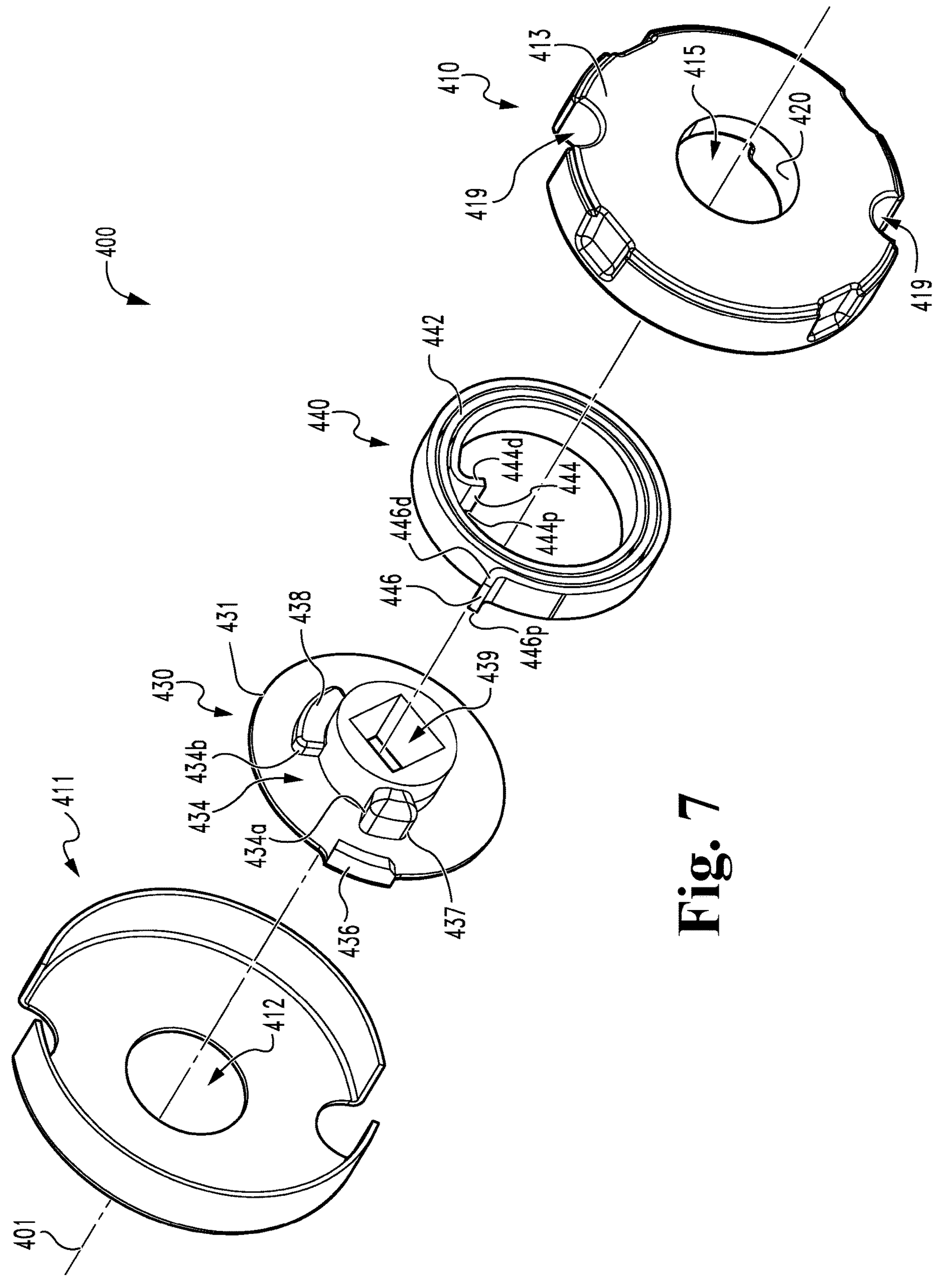
FIG. 7 is a second exploded assembly view of the spring cage illustrated in FIG. 6.

With additional reference to FIGS. 3-5, illustrated therein is a modular, self-contained, and bidirectional spring cage 300 according to some embodiments. The spring cage 300 may, for example, be utilized as the spring cage 121 of the outside handleset 120, the spring cage 131 of the inside handleset 130, and/or the spring cage 210 of the handleset 200. The spring cage 300 is operable to bias a spindle 390 (e.g., the outside spindle 124, the inside spindle 134, and/or the spindle 240) toward a spindle home position in each of a first rotational direction 392 and a second rotational direction 394 opposite the first rotational direction 392. The spring cage 300 generally includes a housing 310, a first hub 320 rotatably mounted in the housing 310 for rotation about a longitudinal rotational axis 301, a second hub 330 rotatably mounted in the housing 310 for rotation about the longitudinal rotational axis 301, and a biasing member in the form of a clock spring 340. As described herein, the clock spring 340 is engaged with the hubs 320, 330 such that the clock spring 340 is operable to bias the spindle 390 toward the spindle home position in each of the first rotational direction 392 and the second rotational direction 394.

The housing 310 generally includes a cover 311 and a generally annular body portion 313 on which the cover 311 is seated to enclose the hubs 320, 330 and the clock spring 340 within the housing 310. The cover 311 includes a circular opening 312 that rotatably supports the first hub 320. The body portion 313 includes a distal wall 314 having an opening 315 formed therein, and an annular wall 316 extending proximally from the distal wall 314. A protrusion 317 also extends proximally from the distal wall 314, and an arcuate recess 318 is formed in the annular wall 316. The arcuate recess 318 is bounded on one end by a first shoulder **318*a* and is bounded on an opposite end by a second shoulder 318*b*. In the illustrated form, the housing 310 further includes cutouts 319 sized and positioned to receive lugs (e.g., the lugs 260) to prevent rotation of the housing 310 relative to the chassis 110**.

The first hub 320 generally includes an opening 329 sized and shaped to receive the spindle 390, and in the illustrated form further includes a circular boss 322 sized and shaped for receipt in the cover opening 312 such that the cover 311 rotatably supports the first hub 320. As described herein, the first hub opening 329 is sized and shaped to form a first lost rotational motion coupling 302 with the spindle 390 such that the first hub 320 rotates with the spindle 390 when the spindle 390 rotates from the spindle home position in the first rotational direction 392, while the first hub 320 remains in a first hub home position when the spindle 390 rotates from the spindle home position in the second rotational direction 394.

The first hub 320 further includes a notch 324 operable to receive a first leg 344 of the clock spring 340, and an arcuate recess 327 is formed in the radially-outer surface of the first hub 320. The arcuate recess 327 is bounded on one end by a first shoulder **327*a* and is bounded on an opposite end by a second shoulder 327*b*. The arcuate recess 327 receives the protrusion 317 of the housing 310** such that the protrusion 317 limits rotation of the first hub 320 to a first hub limited rotational range. More particularly, the protrusion 317 permits limited rotation of the first hub 320 from the first hub home position in the first rotational direction 392 while preventing rotation of the first hub 320 from the first hub home position in the second rotational direction 394. As such, rotation of the first hub 320 is limited to rotation between the first hub home position and a first hub rotated position.

The second hub 330 generally includes a plate portion 332 having an opening 339 formed therein, and a circular boss 335 may be formed on the distal side of the plate portion 332. In such forms, the boss 335 may be sized and shaped for receipt in the opening 315 such that the body portion 313 rotatably supports the second hub 330. Like the first hub opening 329, the second hub opening 339 is sized and shaped to form a second lost rotational motion coupling 304 with the spindle 390. However, the second lost rotational coupling 304 is configured such that the second hub 330 rotates with the spindle 390 when the spindle 390 rotates from the spindle home position in the second rotational direction 394, while the second hub 330 remains in a second hub home position when the spindle 390 rotates from the spindle home position in the first rotational direction 392. The second hub 330 further includes an arcuate slot 337 having a first end 337*a* and an opposite second end 337*b*. The arcuate slot 337 is formed in the plate portion 332 and receives the protrusion 317 such that the protrusion 317 limits rotation of the second hub 330 to a second hub limited rotational range. More particularly, the protrusion 317 permits limited rotation of the second hub 330 from the second hub home position in the second rotational direction 394 while preventing rotation of the second hub 330 from the second hub home position in the first rotational direction 392. As such, rotation of the second hub 330 is limited to rotation between the second hub home position and a second hub rotated position. The second hub 330 further includes a longitudinal finger 336 that is received in the arcuate recess 318 and engaged with a second leg 346 of the clock spring 340.

The clock spring 340 generally includes a spiral-wound body portion 342 that terminates on a radially-inner end with a first leg 344 and terminates on a radially-outer end with a second leg 346. The first leg 344 is captured in the notch 324 of the first hub 320 such that the first hub 320 drives the first leg 344 during rotation of the first hub 320 between the first hub home position and the first hub rotated position. The second leg 346 extends into the arcuate recess 318 and is engaged with the finger 336 such that the second hub 330 drives the second leg 346 during rotation of the second hub 330 between the second hub home position and the second hub rotated position. Those skilled in the art will readily recognize that relative movement of the legs 344, 346 causes deformation of the spring 340 such that the spring 340 exerts a restoring torque in the direction opposite that of the deformation. As described herein, such a restoring torque is transmitted to the spindle 390 to bias the spindle 390 toward the spindle home position in each of the first rotational direction 392 and the second rotational direction 394.

As noted above, each of the hubs 320, 330 is engaged with the spindle 390 via a corresponding and respective lost rotational motion coupling 302, 304. More particularly, the first hub 320 is engaged with the spindle 390 via a first lost rotational motion coupling 302, and the second hub 330 is engaged with the spindle 390 via a second lost rotational motion coupling 304. As described herein, these lost rotational motion couplings 302, 304 facilitate rotation of the hubs 320, 330 relative to the housing 310 to cause the spring 340 to exert a return torque biasing the spindle 390 toward the spindle home position in each of the first rotational direction 392 and the second rotational direction 394.

FIG. 4 illustrates the spring cage 300 during rotation of the spindle 390 in the first rotational direction 392, during which the first lost rotational motion coupling 302 causes a corresponding rotation of the first hub 320 while the second lost rotational motion coupling 304 causes the second hub 330 to remain in the second hub home position. More particularly, rotation of the spindle 390 in the first rotational direction 392 causes the spindle 390 to engage edges of the first hub opening 329 to thereby drive the first hub 320 in the first rotational direction 392. Such rotation of the first hub 320 causes a corresponding rotation of the first leg 344, which is seated in the notch 324. As a result, the spring 340 urges the second hub 330 to rotate in the first rotational direction 392. Such rotation of the second hub 330 is prevented, however, via at least one of engagement between the protrusion 317 and the first slot end 337*a* and/or engagement of the finger 336 with the first shoulder 318*a* of the arcuate recess 318. Thus, the spindle 390 drives the first hub 320 via the first lost rotational motion coupling 302, while the second lost rotational motion coupling 304 permits the spindle 390 to rotate relative to the stationary second hub 330. Additionally, the spring 340 deforms as the first leg 344 is driven to rotate with the first hub 320 while the second leg 346 remains stationary with the second hub 330, thereby causing the spring 340 to exert a return torque τ340 in the second rotational direction 394. As a result, the spring cage 300 generates a return torque τ340 in the second rotational direction 394 in response to rotation of the spindle 390 in the first rotational direction 392, thereby biasing the spindle 390 toward the spindle home position when the spindle 390 is rotated in the first rotational direction 392.

FIG. 5 illustrates the spring cage 300 during rotation of the spindle 390 in the second rotational direction 394, during which the second lost rotational motion coupling 304 causes a corresponding rotation of the second hub 330 while the first lost rotational motion coupling 302 causes the first hub 320 to remain in the first hub home position. More particularly, rotation of the spindle 390 in the second rotational direction 394 causes the spindle 390 to engage edges of the second hub opening 339 to thereby drive the second hub 330 in the second rotational direction 394. Such rotation of the second hub 330 causes a corresponding rotation of the second leg 346, which is engaged with the finger 336. As a result, the spring 340 urges the first hub 320 to rotate in the second rotational direction 394. Such rotation of the first hub 320 is prevented, however, via engagement of the protrusion 317 with the second shoulder 327*b* of the arcuate recess 327. Thus, the spindle 390 drives the second hub 330 via the second lost rotational motion coupling 304, while the first lost rotational motion coupling 302 permits the spindle 390 to rotate relative to the stationary first hub 320. Additionally, the spring 340 deforms as the second leg 346 is driven to rotate with the second hub 330 while the first leg 344 remains stationary with the first hub 320, thereby causing the spring 340 to exert a return torque τ340' in the first rotational direction 392. As a result, the spring cage 300 generates a return torque τ340' in the first rotational direction 392 in response to rotation of the spindle 390 in the second rotational direction 394, thereby biasing the spindle 390 toward the spindle home position when the spindle 390 is rotated in the second rotational direction 394.

As noted above, each of the first hub 320 and the second hub 330 is operable to rotate through a limited rotational range spanning from a home position to a rotated position. Certain features of the spring cage 300 may aid in restricting the spindle 390 between a first spindle rotated position and a second spindle rotated position, wherein the spindle home position is located between the first spindle rotated position and the second spindle rotated position.

During rotation of the spindle 390 from the spindle home position in the first rotational direction 392, the first hub 320 rotates with the spindle 390 as described above. When the spindle 390 reaches the first spindle rotated position, however, the first shoulder 327*a* of the arcuate recess 327 engages the protrusion 317, thereby preventing rotation of the first hub 320 and the spindle 390 beyond the first spindle rotated position in the first rotational direction 392.

Similarly, during rotation of the spindle 390 from the spindle home position in the second rotational direction 394, the second hub 330 rotates with the spindle 390 as described above. When the spindle 390 reaches the second spindle rotated position, however, the second end 337*b* of the arcuate slot 337 engages the protrusion 317 and/or the finger 336 engages the second shoulder 318*b* of the arcuate recess 318 via the second leg 346, either of which may prevent rotation of the second hub 330 and the spindle 390 beyond the second spindle rotated position in the second rotational direction 394.

In some embodiments, the spring cage 300 may further include a viscous damping grease that slows rotation of one or both hubs 320, 330 relative to the housing 310. As one example, the viscous damping grease may be applied between the first hub 320 and the cover 311 to slow rotation of the first hub 320 relative to the housing 310. As another example, the viscous damping grease may be applied between the second hub 330 and the housing body portion 313 to slow rotation of the second hub 330 relative to the housing 310. It has been found that such viscous damping grease, in slowing the rotation of the hubs 320, 330 relative to the housing 310, slows the return of the spindle 390 to the spindle home position, which may reduce noise generation and/or improve the user experience in other ways.

With additional reference to FIGS. 6-9, illustrated therein is a modular, self-contained, and bidirectional spring cage 400 according to some embodiments. The spring cage 400 may, for example, be utilized as the spring cage 121 of the outside handleset 120, the spring cage 131 of the inside handleset 130, and/or the spring cage 210 of the handleset 200. The spring cage 400 is operable to bias a spindle 490 (e.g., the outside spindle 124, the inside spindle 134, and/or the spindle 240) toward a spindle home position in each of a first rotational direction 492 and a second rotational direction 494 opposite the first rotational direction 492. The spring cage 400 generally includes a housing 410, a hub 430 rotatably mounted in the housing 410 for rotation about a longitudinal rotational axis 401, and a biasing member in the form of a clock spring 440. As described herein, the clock spring 440 is engaged with the hub 430 such that the clock spring 440 is operable to bias the spindle 490 toward the spindle home position in each of the first rotational direction 492 and the second rotational direction 494.

The housing 410 generally includes a cover 411 and a generally annular body portion 413 on which the cover 411 is seated to enclose the hub 430 and the clock spring 440 within the housing 410. The cover 411 includes a circular opening 412 that rotatably supports the hub 430. The body portion 413 includes a distal wall 414 having an opening 415 formed therein, and an annular wall 416 extending proximally from the distal wall 414. A ridge 417 also extends proximally from the distal wall 414, and is positioned in arcuate recess 418 formed in the annular wall 416. The arcuate recess 418 is bounded on one end by a first shoulder 418*a* and is bounded on an opposite end by a second shoulder 418*b*. In the illustrated form, the housing 410 further includes cutouts 419 sized and positioned to receive lugs (e.g., the lugs 260) to prevent rotation of the housing 410 relative to the chassis 110. Also formed within the recessed portion of the body portion 413 is an arcuate ridge 420.

The arcuate ridge 420 extends proximally from the distal wall 414 and partially surrounds the opening 415. The ridge 420 generally includes a first or lower level 427 and a second or upper level 428 that extends proximally beyond the first or lower level 427. A first shoulder 421 is formed at the location at which the lower level 427 projects from the distal wall 414, a second shoulder 422 is defined at the location at which the upper level 428 projects from the lower level 427, and a third shoulder 423 is formed at the location at which the upper level 428 projects from the distal wall 414. The proximal extent of the lower level 427 may be about the same as the proximal extent of the ridge 417 such that the proximal faces of the ridge 417 and the lower level 427 are substantially coplanar.

The hub 430 generally includes an opening 439 sized and shaped to receive the spindle 490, and in the illustrated form further includes plate portion 431 and a proximal circular boss 432 extending proximally from the plate portion 431. The proximal boss 432 is sized and shaped for receipt in the cover opening 412 such that the cover 411 rotatably supports the hub 430. Formed on the distal side of the hub 430 is a distal boss 435 that extends into the body portion opening 415 such that the body portion 413 rotatably supports the hub 430. A finger 436 projects distally from the radial edge of the plate portion 431 and into the arcuate recess 418. When the hub 430 is in a hub home position, the finger 436 is aligned with the ridge 417.

Projecting radially from the distal boss 435 are a first protuberance 437 and a second protuberance 438 that is angularly offset from the first protuberance 437 such that an arcuate recess 434 is defined between the protuberances 437, 438. The recess 434 is bounded on one side by a first shoulder 434*a* defined by the first protuberance 437, and is bounded on the opposite side by a second shoulder 434*b* defined by the second protuberance 438. The first protuberance 437 projects distally beyond the second protuberance 438, and may be referred to herein as taller than the second protuberance 438. Thus, the first shoulder 434*a* is taller than the second shoulder 434*b*. The first protuberance 437 is aligned with the lower landing 426, and the second protuberance 438 is aligned with the upper level 428. The longitudinal dimensions of the arcuate ridge 420 and the protuberances 437, 438 are selected such that the shoulder 424 is operable to engage the taller first protuberance 437 to thereby limit rotation of the hub 430 in the second rotational direction 494.

The clock spring 440 generally includes a spiral-wound body portion 442 that terminates on a radially-inner end with a first leg 444 and terminates on a radially-outer end with a second leg 446. Each leg 444, 446 extends longitudinally and has a proximal portion and a distal portion. More particularly, the first leg 444 includes a first leg proximal portion 444*p* and a first leg distal portion 444*d*, and the second leg 446 includes a second leg proximal portion 446*p* and a second leg distal portion 446*d*. The first leg 444 is received in the arcuate recess 434 of the hub 430 and is operable to engage the second protuberance 438 and the first shoulder 421. More particularly, the proximal portion 444*p* of the first leg 444 is operable to engage the second protuberance 438, and the distal portion 444*d* of the first leg 444 is operable to engage the first shoulder 421. The second leg 446 extends into the arcuate recess 418 of the housing 410, and is operable to engage the finger 436 and the ridge 417. More particularly, the proximal portion 446*p* of the second leg 446 is operable to engage the finger 436, and the distal portion 446*d* of the second leg 446 is operable to engage the ridge 417. Those skilled in the art will readily recognize that relative movement of the legs 444, 446 causes deformation of the spring 440 such that the spring 440 exerts a restoring torque in the direction opposite that of the deformation. As described herein, such a restoring torque is transmitted to the spindle 490 to bias the spindle 490 toward the spindle home position in response to rotation of the spindle 490 in each and either of the first rotational direction 492 and the second rotational direction 494.

Figure 8:
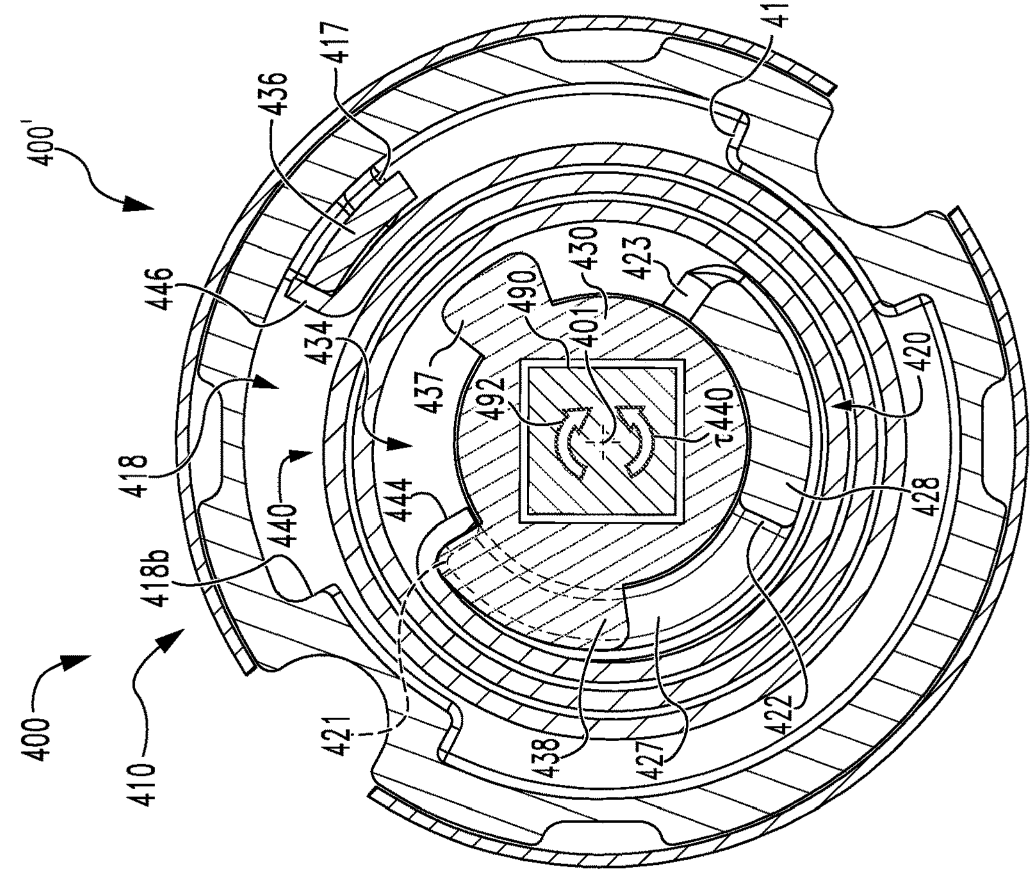
FIG. 8 is a cross-sectional view of an apparatus including the spring cage illustrated in FIG. 6 indicating rotation of a spindle in a first rotational direction.
Figure 10:
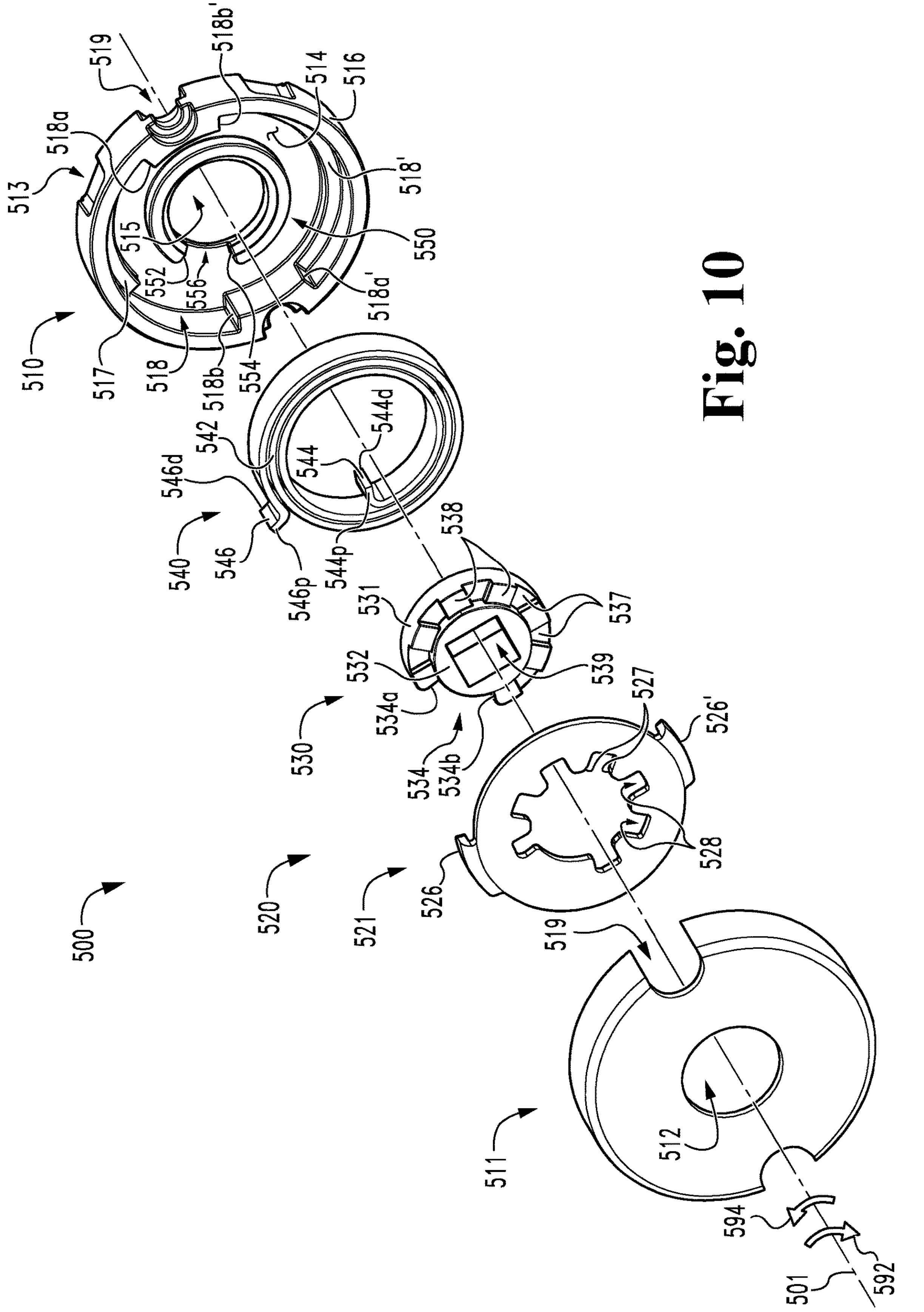
FIG. 10 is a first exploded assembly view of a spring cage according to some embodiments.
Figure 11:
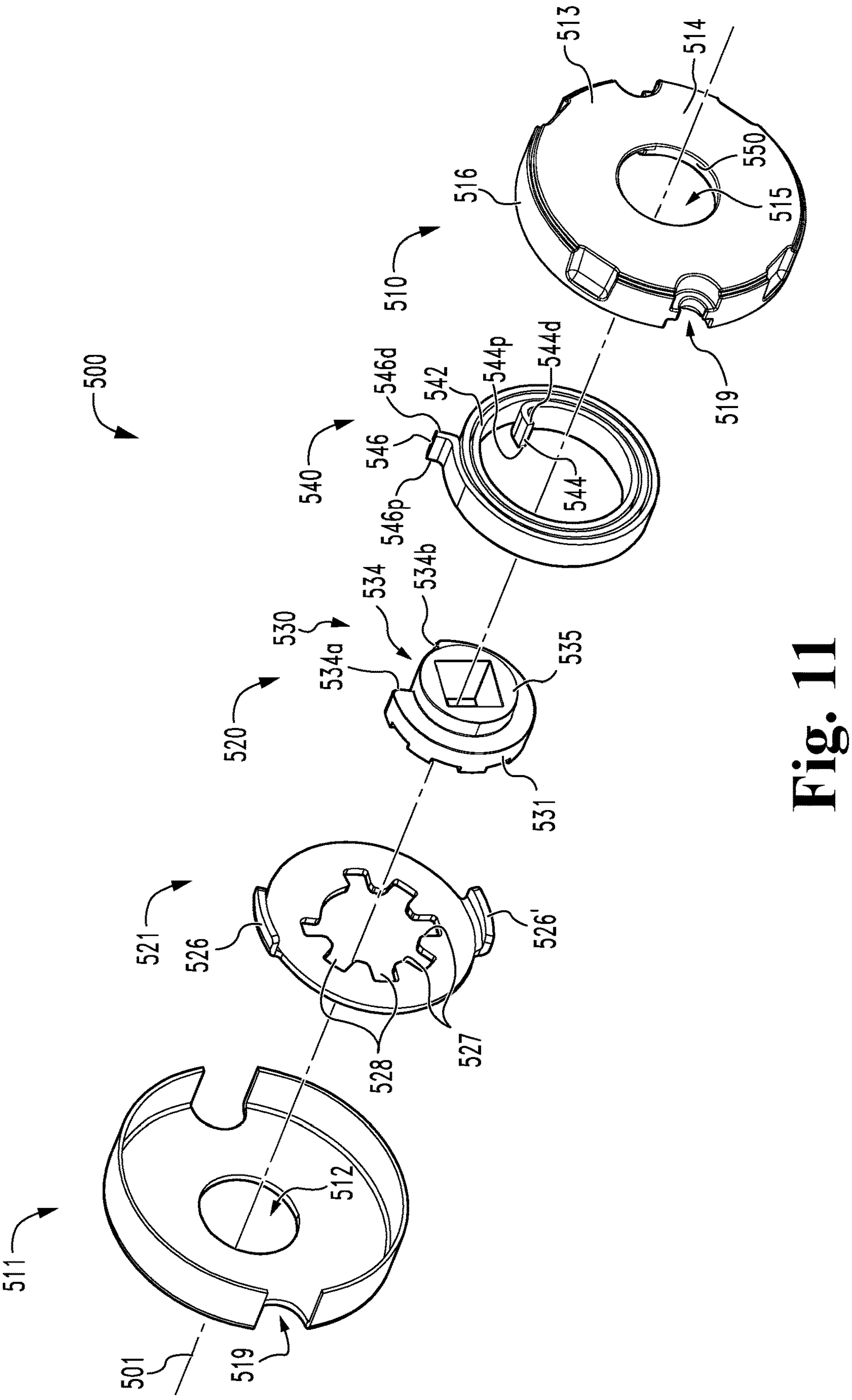
FIG. 11 is a second exploded assembly view of the spring cage illustrated in FIG. 10.

FIG. 8 illustrates the spring cage 400 during rotation of the spindle 490 in the first rotational direction 492. Due to the rotational coupling between the hub 430 and the spindle 490, such rotation of the spindle 490 causes a corresponding rotation of the hub 430 in the first rotational direction 492, thereby causing the finger 436 and the protuberances 437, 438 to revolve about the rotational axis 401. During such rotation of the hub 430, the second protuberance 438 engages the first leg proximal portion 444*p* and carries the first leg 444 therewith, thereby urging the spring 440 to rotate in the first direction 492. However, the second leg distal portion 446*d* remains engaged with the ridge 417, which anchors the second leg 446 in place. Movement of the first leg 444 while the second leg 446 remains stationary deforms the spring 440, thereby causing the spring 440 to exert a return torque τ440 on the hub 430 in the second direction 494. Thus, the spring cage 400 generates a return torque τ440 in the second rotational direction 494 in response to rotation of the spindle 490 in the first rotational direction 492, thereby biasing the spindle 490 toward the spindle home position when the spindle 490 is rotated in the first rotational direction 492.

Figure 9:
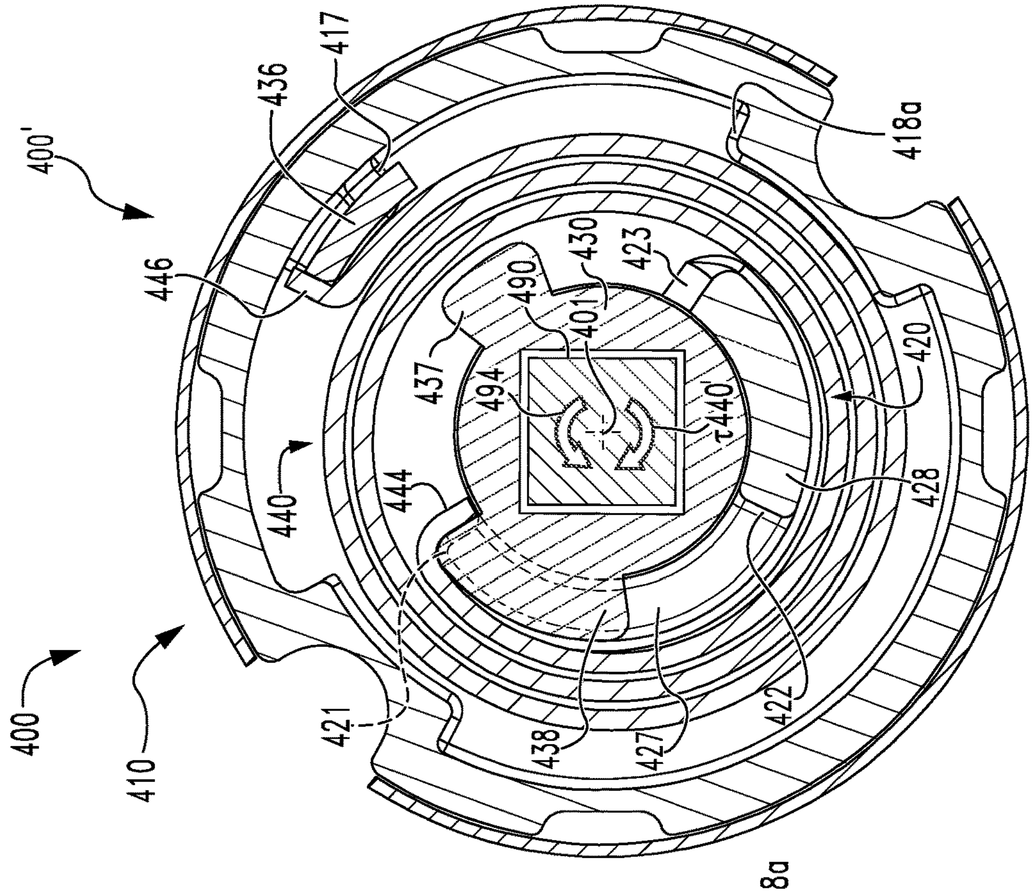
FIG. 9 is a cross-sectional view of the apparatus illustrated in FIG. 8 indicating rotation of the spindle in a second rotational direction opposite the first rotational direction.

FIG. 9 illustrates the spring cage 400 during rotation of the spindle 490 in the second rotational direction 494. Due to the rotational coupling between the hub 430 and the spindle 490, such rotation of the spindle 490 causes a corresponding rotation of the hub 430 in the second rotational direction 494, thereby causing the finger 436 and the protuberances 437, 438 to revolve about the rotational axis 401. During such rotation of the hub 430, the finger 436 engages the second leg proximal portion 446*p* and carries the second leg 446 therewith, thereby urging the spring 440 to rotate in the second direction 494. However, the first leg distal portion 446*d* remains engaged with the first shoulder 421, which anchors the first leg 444 in place. Movement of the second leg 446 while the first leg 444 remains stationary deforms the spring 440, thereby causing the spring 440 to exert a return torque τ440' on the hub 430 in the first direction 492. Thus, the spring cage 400 generates a return torque τ440 in the first rotational direction 492 in response to rotation of the spindle 490 in the second rotational direction 494, thereby biasing the spindle 490 toward the spindle home position when the spindle 490 is rotated in the second rotational direction 494.

As with the above-described hubs 320, 330, the hub 430 is operable to rotate through a limited rotational range spanning from a first hub rotated position to a second hub rotated position, and a hub home position is located between the first hub rotated position and the second hub rotated position. The spindle 490 is thus likewise limited to rotation through a limited rotational range spanning from a first spindle rotated position to a second spindle rotated position, and the spindle home position is located between the first spindle rotated position and the second spindle rotated position. Certain features of the spring cage 400 may aid in restricting the hub 430, and thus the spindle 490, to such a limited rotational range.

During rotation of the spindle 490 from the spindle home position in the first rotational direction 492, the hub 430 rotates with the spindle 490 as described above with reference to FIG. 8. When the spindle 490 reaches the first spindle rotated position, however, the first protuberance 437 engages the third shoulder 423 and/or the finger 436 engages the first shoulder 418*a* of the arcuate recess 418, either of which may prevent rotation of the hub 430 and the spindle 490 beyond the first spindle rotated position in the first rotational direction 492. Similarly, during rotation of the spindle 490 from the spindle home position in the second rotational direction 494, the hub 430 rotates with the spindle 490 as described above with reference to FIG. 9. When the spindle 490 reaches the second spindle rotated position, however, the second protuberance 438 engages the second shoulder 422 and/or the finger 436 engages the second shoulder 418*b* of the arcuate recess 418 via the second leg 446, either of which may prevent rotation of the hub 430 and the spindle 490 beyond the second spindle rotated position in the second rotational direction 494.

In some embodiments, the spring cage 400 may further include a viscous damping grease that slows rotation of the hub 430 relative to the housing 410. For example, the viscous damping grease may be applied between the hub 430 and the cover 411 and/or between the hub 430 and the body portion 413, either of which may slow rotation of the hub 430 relative to the housing 410.

With additional reference to FIGS. 10-13, illustrated therein is a modular, self-contained, and bidirectional spring cage 500 according to some embodiments. The spring cage 500 may, for example, be utilized as the spring cage 121 of the outside handleset 120, the spring cage 131 of the inside handleset 130, and/or the spring cage 210 of the handleset 200. The spring cage 500 is operable to bias a spindle 590 (e.g., the outside spindle 124, the inside spindle 134, and/or the spindle 240) toward a spindle home position in each of a first rotational direction 592 and a second rotational direction 594 opposite the first rotational direction 592. The spring cage 500 generally includes a housing 510, a hub 520 rotatably mounted in the housing 510 for rotation about a longitudinal rotational axis 501, and a biasing member in the form of a clock spring 540. As described herein, the clock spring 540 is engaged with the hub 520 such that the clock spring 540 is operable to bias the spindle 590 toward the spindle home position in each of the first rotational direction 492 and the second rotational direction 494.

The housing 510 generally includes a cover 511 and a generally annular body portion 513 on which the cover 511 is seated to enclose the hub 520 and the clock spring 540 within the housing 510. The cover 511 includes a circular opening 512 that rotatably supports the hub 520. The body portion 513 includes a distal wall 514 having an opening 515 formed therein, and an annular wall 516 extending proximally from the distal wall 514. A ridge 517 also extends proximally from the distal wall 514, and is positioned in an arcuate recess 518 formed in the annular wall 516. In the illustrated form, a second arcuate recess 518' is positioned opposite the arcuate recess 518 in which the ridge 517 is positioned. The first arcuate recess 518 is bounded on one end by a first shoulder 518*a* and is bounded on an opposite end by a second shoulder 518*b*. Similarly, the second arcuate recess 518' is bounded on one end by a first shoulder 518*a*' and is bounded on an opposite end by a second shoulder 518*b*'. In the illustrated form, the housing 510 further includes cutouts 519 sized and positioned to receive lugs (e.g., the lugs 260) to prevent rotation of the housing 510 relative to the chassis 110. Also formed within the recessed portion of the body portion 513 is an arcuate ridge 550 that partially circumferentially surrounds the opening 512. One end of the ridge 550 terminates in a first shoulder 552, the opposite end of the ridge 550 terminates in a second shoulder 554, and a gap 556 is formed between the shoulders 552, 554.

In the illustrated form, the hub 520 is provided as a two-piece hub, and generally includes a hub body portion 530 and a plate member 521 mounted to the body portion 530. The plate member 521 includes a series of radial projections 527 and recesses 528 that facilitate rotational coupling of the plate member 521 and the body portion 530 as described herein. At least one finger 526 projects distally from the radially outer edge of the plate member 521, and in the illustrated form a pair of diametrically opposite fingers 526, 526' project distally from the radially outer edge of the plate member 521. The first finger 526 projects into the first arcuate recess 518 of the housing 510 and is operable to engage the second leg 546 of the clock spring 540. In embodiments that include the second finger 526', the second finger 526' may project into the second arcuate recess 518' of the housing 510.

The body portion 530 of the hub 520 generally includes an opening 539 sized and shaped to receive the spindle 590, and in the illustrated form further includes flange 531 and a proximal circular boss 532 extending proximally from the flange 531. The proximal boss 532 is sized and shaped for receipt in the opening 512 such that the cover 511 rotatably supports the hub 520. Formed on the distal side of the body portion 530 is a distal boss 535 that extends into the opening 515 such that the body portion 513 of the housing 510 rotatably supports the hub 520. The flange 531 has a gap 534 formed therein, and each side of the gap 534 is bounded by a corresponding and respective shoulder 534*a*, 534*b*. The proximal side of the flange 531 includes a series of a recesses 537 and projections 538 that mate with the projections 527 and recesses 528 to rotationally couple the plate member 521 with the hub body portion 530.

The clock spring 540 generally includes a spiral-wound body portion 542 that terminates on a radially-inner end with a first leg 544 and terminates on a radially-outer end with a second leg 546. Each leg 544, 546 extends longitudinally and has a proximal portion and a distal portion. More particularly, the first leg 544 includes a first leg proximal portion 544*p* and a first leg distal portion 544*d*, and the second leg 546 includes a second leg proximal portion 546*p* and a second leg distal portion 546*d*. The proximal portion 544*p* of the first leg 544 is received in the gap 534 of the hub 520 and is engaged with the second shoulder 534*a*. The distal portion 544*d* of the first leg 544 is received in the gap 556 and is engaged with the second shoulder 554. The second leg 546 extends into the arcuate recess 518 of the housing 510, and is operable to engage each of the finger 526 and the ridge 517. More particularly, the proximal portion 546*p* of the second leg 546 is operable to engage the finger 526, and the distal portion 546*d* of the second leg 546 is operable to engage the ridge 517. Those skilled in the art will readily recognize that relative movement of the legs 544, 546 causes deformation of the spring 540 such that the spring 540 exerts a restoring torque in the direction opposite that of the deformation. As described herein, such a restoring torque is transmitted to the spindle 590 to bias the spindle 590 toward the spindle home position in each of the first rotational direction 592 and the second rotational direction 594.

Figure 12:
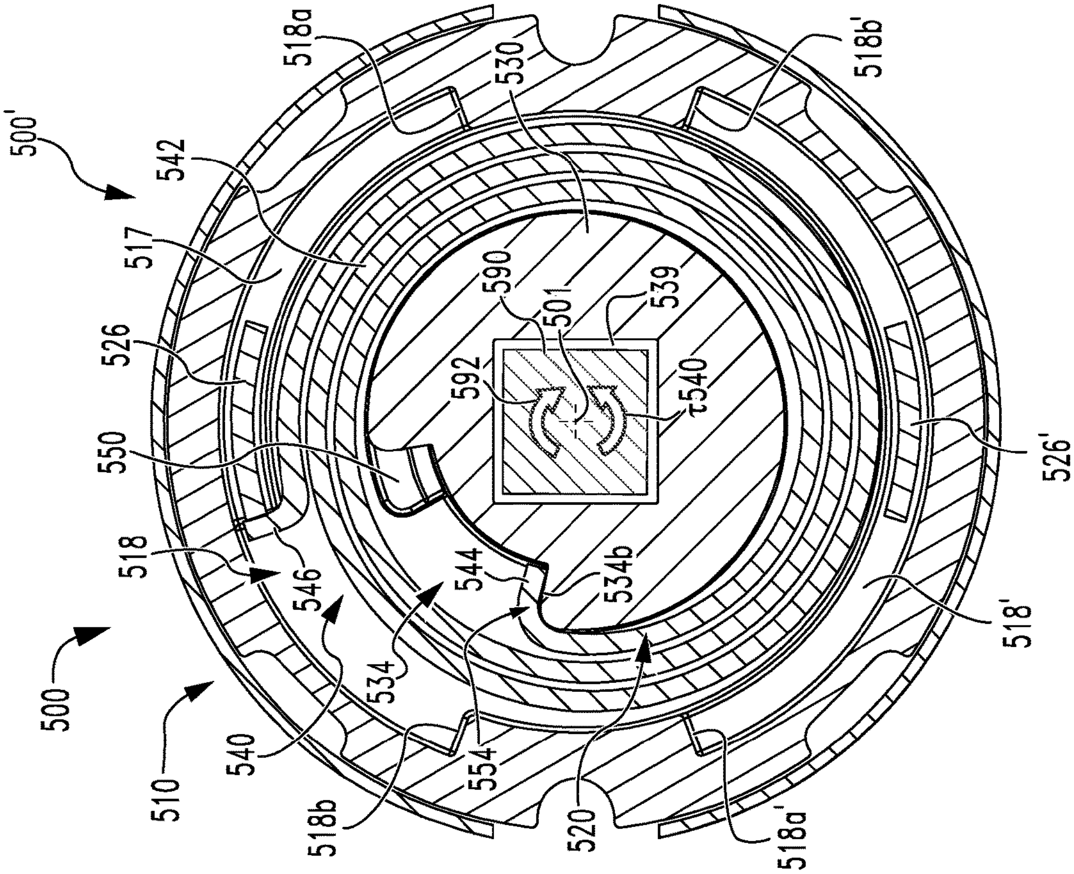
FIG. 12 is a cross-sectional view of an apparatus including the spring cage illustrated in FIG. 10 indicating rotation of a spindle in a first rotational direction.

FIG. 12 illustrates the spring cage 500 during rotation of the spindle 590 in the first rotational direction 592. Due to the rotational coupling between the hub body portion 530 and the spindle 590, such rotation of the spindle 590 causes a corresponding rotation of the hub 520 in the first rotational direction 592, thereby causing the finger 526 and the flange 531 to revolve about the rotational axis 501. During such rotation of the hub 520, the second shoulder 534*b* engages the first leg proximal portion 544*p* and carries the first leg 544 therewith, thereby urging the spring 540 to rotate in the first rotational direction 592. However, the second leg distal portion 546*d* remains engaged with the ridge 517, which anchors the second leg 546 in place. Movement of the first leg 544 while the second leg 546 remains stationary deforms the spring 540, thereby causing the spring 540 to exert a return torque τ540 on the hub 520 in the second direction 594. Thus, the spring cage 500 generates a return torque τ540 in the second rotational direction 594 in response to rotation of the spindle 590 in the first rotational direction 592, thereby biasing the spindle 590 toward the spindle home position when the spindle 590 is rotated in the first rotational direction 592.

Figure 13:
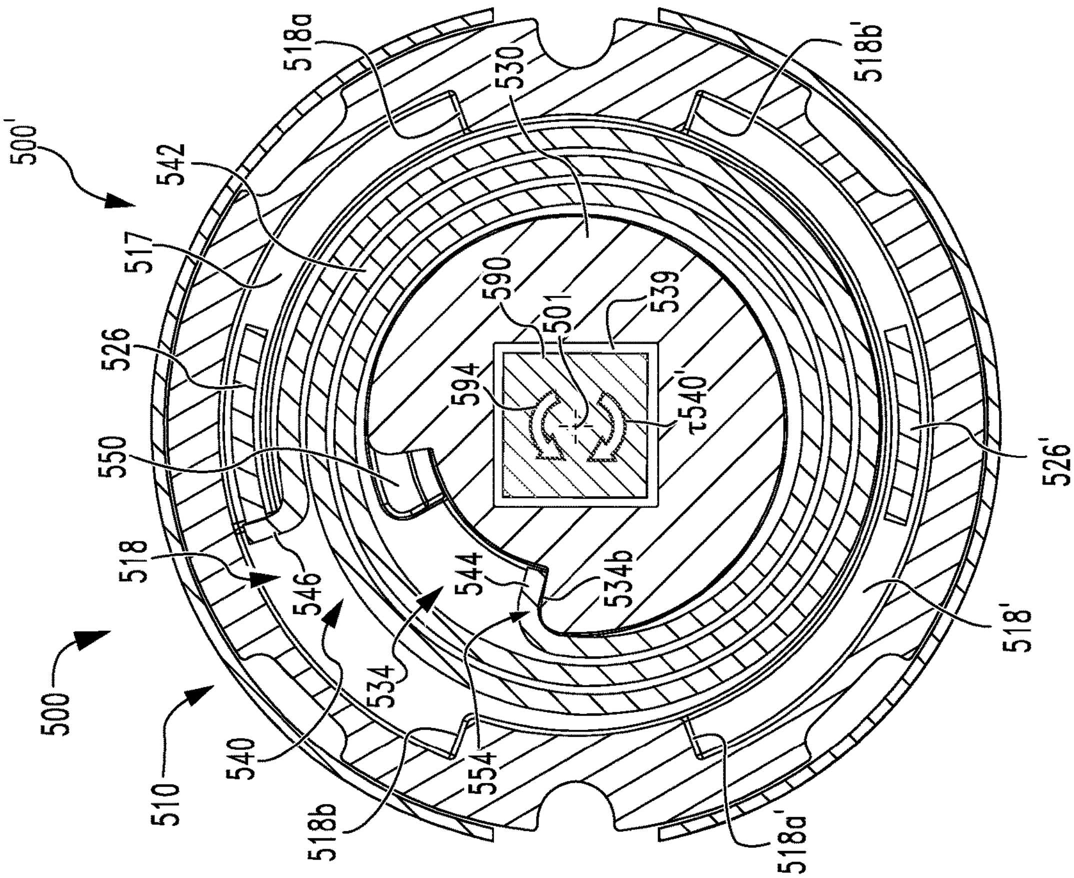
FIG. 13 is a cross-sectional view of the apparatus illustrated in FIG. 12 indicating rotation of the spindle in a second rotational direction opposite the first rotational direction.

FIG. 13 illustrates the spring cage 500 during rotation of the spindle 590 in the second rotational direction 594. Due to the rotational coupling between the hub body portion 530 and the spindle 590, such rotation of the spindle 590 causes a corresponding rotation of the hub 520 in the second rotational direction 594, thereby causing the finger 526 and the flange 531 to revolve about the rotational axis 501. During such rotation of the hub 520, the finger 536 engages the second leg proximal portion 546*p* and carries the second leg 546 therewith, thereby urging the spring 540 to rotate in the second rotational direction 594. However, the first leg distal portion 546*d* remains engaged with the second shoulder 554 of the arcuate ridge 550, which anchors the first leg 544 in place. Movement of the second leg 546 while the first leg 544 remains stationary deforms the spring 540, thereby causing the spring 540 to exert a return torque τ540' on the hub 530 in the first direction 592. Thus, the spring cage 500 generates a return torque τ540' in the first rotational direction 592 in response to rotation of the spindle 590 in the second rotational direction 594, thereby biasing the spindle 590 toward the spindle home position when the spindle 590 is rotated in the second rotational direction 594.

As with the above-described hub 430, the hub 520 is operable to rotate through a limited rotational range spanning from a first hub rotated position to a second hub rotated position, and a hub home position is located between the first hub rotated position and the second hub rotated position. The spindle 590 is thus likewise limited to rotation through a limited rotational range spanning from a first spindle rotated position to a second spindle rotated position, and the spindle home position is located between the first spindle rotated position and the second spindle rotated position. Certain features of the spring cage 500 may aid in restricting the hub 520, and thus the spindle 590, to such a limited rotational range.

During rotation of the spindle 590 from the spindle home position in the first rotational direction 592, the hub 520 rotates with the spindle 590 as described above with reference to FIG. 12. When the spindle 590 reaches the first spindle rotated position, however, each finger 526 engages the first shoulder 518*a*, 518*a*' of the corresponding arcuate recess 518, 518' such that the housing 510 prevents rotation of the hub 520 and the spindle 590 beyond the first spindle rotated position in the first rotational direction 592. Similarly, during rotation of the spindle 590 from the spindle home position in the second rotational direction 594, the hub 520 rotates with the spindle 590 as described above with reference to FIG. 13. When the spindle 590 reaches the second spindle rotated position, however, each finger 526 engages the second shoulder 518*b*, 518*b*' of the corresponding arcuate recess 518, 518' such that the housing 510 prevents rotation of the hub 520 and the spindle 590 beyond the second spindle rotated position in the second rotational direction 594.

In some embodiments, the spring cage 500 may further include a viscous damping grease that slows rotation of the hub 520 relative to the housing 510. For example, the viscous damping grease may be applied between the hub 520 and the cover 511 and/or between the hub 520 and the body portion 513, either of which may slow rotation of the hub 520 relative to the housing 510.

As noted above, each of the modular spring cages 300, 400, 500 may be utilized in a handleset such as the handleset 200 and/or a lockset such as the lockset 100. When so utilized, the modular, bi-directional spring cages 300, 400, 500 may provide advantages over existing spring cages. For example, existing modular spring cages may be handed, and are operable to bias the spindle and/or handle toward a home position in only a single direction. Such conventional spring cages must therefore be installed on the correct side of the door and in the appropriate orientation. The bi-directional spring cages 300, 400, 500 described herein, however, are operable to be installed in plural orientations while maintaining the functionality of biasing the handle toward the home position, which may mitigate the potential for installation errors. Moreover, the modularity of the spring cages 300, 400, 500 may enable the same spring cage to be utilized in plural formats of handleset and lockset, which may reduce inventory costs by providing greater flexibility.

While the spring cages 300, 400, 500 are capable of use with the illustrated lockset 100 and handleset 200, it should be appreciated that the spring cages 300, 400, 500 are not limited to use with the mortise lockset 100 illustrated in FIG. 1 and the handleset 200 illustrated in FIG. 2. For example, the spring cages 300, 400, 500 described herein may be utilized in combination with another form of lockset, such as a cylindrical lockset, a tubular lockset, or another form of lockset. Moreover, the spring cages 300, 400, 500 may be utilized in combination with other forms of handlesets, such as those in which the spindle directly engages the handle and/or those of a different format, such as an escutcheon-based handleset.

In addition to the potential for being provided in a handleset and/or a lockset, the spring cages 300, 400, 500 may be provided as an apparatus that includes the spring cage and the spindle. For example, FIGS. 4 and 5 illustrate an apparatus 300' that includes the spring cage 300 and the spindle 390, FIGS. 8 and 9 illustrate an apparatus 400' that includes the spring cage 400 and the spindle 490, and FIGS. 12 and 13 illustrate an apparatus 500' that includes the spring cage 500 and the spindle 590. In such apparatuses 300', 400', 500', the spindles 390, 490, 590 may be slidable relative to the spring cage 300, 400, 500, which may facilitate adjustment for different thicknesses of the door 90. Additionally, such apparatuses 300', 400', 500' may comprise a portion of a handleset such as the handleset 200, in which the spindle 390/490/590 corresponds to the spindle 240. As noted above, while the illustrated spindle 240 is engaged with the handle 230 via a spindle sleeve 220, it is also contemplated that the spindle 240 may be directly engaged with the handle 230 or otherwise rotationally coupled with the handle 230.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:

a modular, self-contained spring cage comprising a housing and a clock spring mounted in the housing, wherein the clock spring comprises a first leg and a second leg; and a spindle extending through the modular, self-contained spring cage, wherein the spindle is rotatable from a home position about a longitudinal axis in each of a first rotational direction and a second rotational direction opposite the first rotational direction;

wherein rotation of the spindle from the home position in the first rotational direction causes pivoting of the first leg while the second leg remains stationary, thereby deforming the clock spring such that the clock spring exerts a first biasing force urging the spindle to return to the home position;

wherein rotation of the spindle from the home position in the second rotational direction causes pivoting of the second leg while the first leg remains stationary, thereby deforming the clock spring such that the clock spring exerts a second biasing force urging the spindle to return to the home position; and wherein the clock spring further comprises a spiral-wound body portion that is wound in a spiral about the longitudinal axis.

2. The apparatus of claim 1, wherein the spindle is slidable along the longitudinal axis relative to the modular, self-contained spring cage.

3. The apparatus of claim 1, wherein the longitudinal axis extends along and defines a proximal direction and an opposite distal direction;

wherein the first leg extends longitudinally and comprises a first leg proximal portion and a first leg distal portion;

wherein the second leg extends longitudinally and comprises a second leg proximal portion and a second leg distal portion;

wherein the modular, self-contained spring cage further comprises a hub that rotates with the spindle during rotation of the spindle from the home position in the first rotational direction; and wherein, during rotation of the spindle from the home position in the first rotational direction, one of the first leg proximal portion or the first leg distal portion is engaged by the hub such that the first leg is carried with the hub, and one of the second leg proximal portion or the second leg distal portion is engaged by the housing such that the second leg remains stationary.

4. The apparatus of claim 3, wherein the hub rotates with the spindle during rotation of the spindle from the home position in the second rotational direction; and wherein, during rotation of the spindle from the home position in the second rotational direction, the other of the first leg proximal portion or the first leg distal portion is engaged by the housing such that the first leg remains stationary, and the other of the second leg proximal portion or the second leg distal portion is engaged by the hub such that the second leg is carried with the hub.

5. The apparatus of claim 3, wherein the hub comprises a body portion and a plate member rotationally coupled with the body portion;

wherein the body portion defines an opening that slidably receives the spindle; and wherein the plate member defines a finger operable to engage the one of the first leg proximal portion or the first leg distal portion.

6. The apparatus of claim 1, wherein the modular, self-contained spring cage further comprises a first hub and a second hub;

wherein the first hub rotates with the spindle during rotation of the spindle from the home position in the first rotational direction and remains stationary during rotation of the spindle from the home position in the second rotational direction;

wherein the second hub rotates with the spindle during rotation of the spindle from the home position in the second rotational direction and remains stationary during rotation of the spindle from the home position in the first rotational direction;

wherein the first leg is engaged with the first hub; and wherein the second leg is engaged with the second hub.

7. A modular, self-contained spring cage operable to bias a spindle toward a home position in each of a first rotational direction about a rotational axis and a second rotational direction opposite the first rotational direction, the modular, self-contained spring cage comprising:

a housing;

at least one hub rotatably mounted in the housing, wherein each hub of the at least one hub comprises an opening operable to receive the spindle; and a clock spring engaged with the at least one hub, the clock spring including a body portion that is wound in a spiral about the rotational axis, and wherein the clock spring comprises a first leg and a second leg;

wherein rotation of the spindle from the home position in the first rotational direction causes pivoting of the first leg while the second leg remains stationary and thereby deforming the clock spring, wherein the clock spring is configured to exert a first return torque on the spindle in response to rotation of the spindle from the home position in the first rotational direction;

wherein rotation of the spindle from the home position in the second rotational direction causes pivoting of the second leg while the first leg remains stationary and thereby deforming the clock spring, wherein the clock spring is configured to exert a second return torque on the spindle in response to rotation of the spindle from the home position in the second rotational direction;

wherein the first return torque is in the second rotational direction and urges the spindle to return to the home position; and wherein the second return torque is in the first rotational direction and urges the spindle to return to the home position.

8. The modular, self-contained spring cage of claim 7, wherein the opening is configured to rotationally couple the at least one hub with the spindle.

9. The modular, self-contained spring cage of claim 7, wherein the at least one hub comprises a first hub and a second hub;

wherein the opening of the first hub is configured to form a first lost rotational motion coupling with the spindle such that the first hub rotates with the spindle during rotation of the spindle from the home position in the first rotational direction, and remains stationary during rotation of the spindle from the home position in the second rotational direction; and wherein the opening of the second hub is configured to form a second lost rotational motion coupling with the spindle such that the second hub rotates with the spindle during rotation of the spindle from the home position in the second rotational direction, and remains stationary during rotation of the spindle from the home position in the first rotational direction.

10. An apparatus comprising the modular, self-contained spring cage of claim 7, the apparatus further comprising the spindle.

11. The apparatus of claim 10, wherein the spindle is slidable along the rotational axis relative to the modular, self-contained spring cage.

12. A handleset comprising the apparatus of claim 10, the handleset further comprising a handle rotationally coupled with the spindle such that the modular, self-contained spring cage is operable to bias the handle toward a handle home position in each of the first rotational direction and the second rotational direction.

13. A spring cage, comprising:

a housing;

a first hub rotatably mounted in the housing for rotation about a longitudinal axis, the first hub having a first home position and a first rotated position;

a second hub rotatably mounted in the housing for rotation about the longitudinal axis, the second hub having a second home position and a second rotated position; and a clock spring engaged with each of the first hub and the second hub, wherein the clock spring comprises:

a first leg engaged with the first hub;

a second leg engaged with the second hub; and a body portion wound about the longitudinal axis in a spiral;

wherein the clock spring is configured to bias the first hub toward the first home position when the first hub is rotated to the first rotated position;

wherein the clock spring is configured to bias the second hub toward the second home position when the second hub is rotated to the second rotated position; and wherein each of the first hub and the second hub includes a corresponding and respective opening sized and shaped to receive a portion of a spindle to thereby define a lost rotational motion connection with the spindle.

14. The spring cage of claim 13, wherein the housing comprises a protrusion that limits each of the first hub and the second hub to a corresponding and respective rotational range.

15. The spring cage of claim 14, wherein the second hub comprises an opening through which the protrusion projects.

16. The spring cage of claim 13, wherein the first hub comprises a notch that receives the first leg.

17. The spring cage of claim 13, wherein the first hub is circumferentially surrounded by the clock spring.

18. The spring cage of claim 13, wherein the housing comprises a pair of diametrically-opposite grooves for receiving fasteners to couple the housing to a door.

19. A modular, self-contained spring cage operable to bias a spindle toward a home position in each of a first rotational direction about a rotational axis and a second rotational direction opposite the first rotational direction, the modular, self-contained spring cage comprising:

a housing;

a first hub and a second hub, each rotatably mounted in the housing; and a clock spring engaged with the at least one hub, the clock spring including a body portion that is wound in a spiral about the rotational axis;

wherein the clock spring is configured to exert a first return torque on the spindle in response to rotation of the spindle from the home position in the first rotational direction;

wherein the clock spring is configured to exert a second return torque on the spindle in response to rotation of the spindle from the home position in the second rotational direction;

wherein the first return torque is in the second rotational direction and urges the spindle to return to the home position;

wherein the second return torque is in the first rotational direction and urges the spindle to return to the home position; and wherein each of the first hub and the second hub includes a corresponding and respective opening sized and shaped to receive a portion of the spindle to thereby define a lost rotational motion connection with the spindle.

20. An apparatus comprising:

a spring cage, comprising:

a housing;

a first hub rotatably mounted in the housing for rotation about a longitudinal axis, the first hub having a first home position and a first rotated position;

a second hub rotatably mounted in the housing for rotation about the longitudinal axis, the second hub having a second home position and a second rotated position; and a clock spring engaged with each of the first hub and the second hub, wherein the clock spring comprises:

a first leg engaged with the first hub;

a second leg engaged with the second hub; and a body portion wound about the longitudinal axis in a spiral; and a spindle engaged with each of the first hub and the second hub via a corresponding and respective lost rotational motion connection;

wherein the clock spring is configured to bias the first hub toward the first home position when the first hub is rotated to the first rotated position; and wherein the clock spring is configured to bias the second hub toward the second home position when the second hub is rotated to the second rotated position.

21. A door handle apparatus, comprising:

a spring cage, comprising:

a housing;

a first hub rotatably mounted in the housing for rotation about a longitudinal axis, the first hub having a first home position and a first rotated position;

a second hub rotatably mounted in the housing for rotation about the longitudinal axis, the second hub having a second home position and a second rotated position; and a clock spring engaged with each of the first hub and the second hub, wherein the clock spring comprises:

a first leg engaged with the first hub;

a second leg engaged with the second hub; and a body portion wound about the longitudinal axis in a spiral; and a door handle engaged with the spring cage;

wherein the spring cage is configured to bias the door handle to a home position;

wherein the clock spring is configured to bias the first hub toward the first home position when the first hub is rotated to the first rotated position; and wherein the clock spring is configured to bias the second hub toward the second home position when the second hub is rotated to the second rotated position.

* * * * *